G. CLEMENTS.
POT-COVER.
No. 184,758. Patented Nov. 28, 1876.
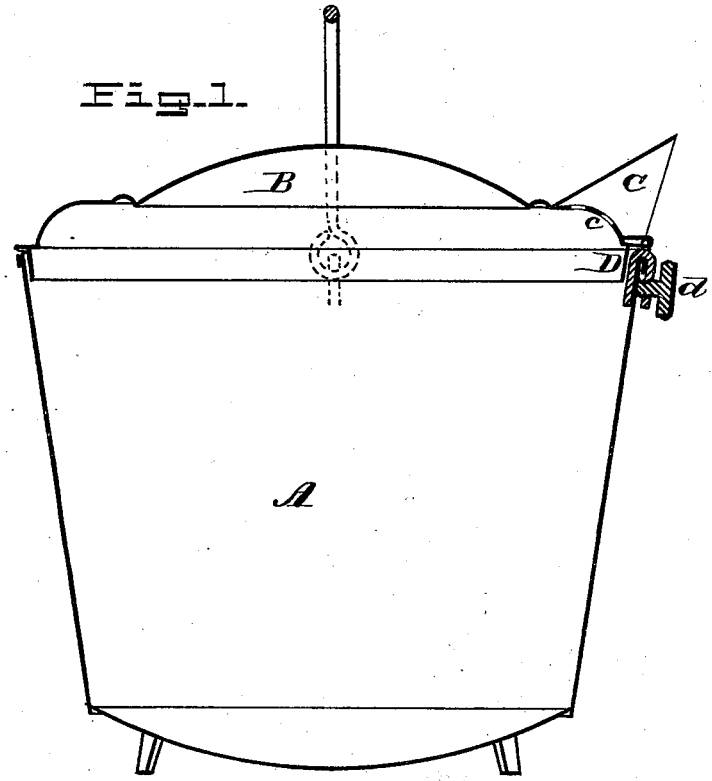
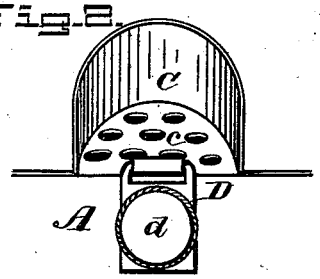
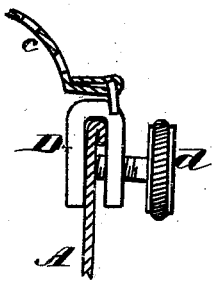
WITNESSES:
H. B. Brown
Jno. F. DuHamel
INVENTOR:
Geo. Clements
PER
H. F. Abbot
ATTORNEY

UNITED STATES PATENT OFFICE.

GEORGE CLEMENTS, OF NEW MILFORD, PENNSYLVANIA.

IMPROVEMENT IN POT-COVERS.

Specification forming part of Letters Patent No. 184,758, dated November 28, 1876; application filed October 28, 1876.

*To all whom it may concern:*

Be it known that I, GEORGE CLEMENTS, of New Milford, in the county of Susquehanna and State of Pennsylvania, have invented certain new and useful Improvements in Pot-Covers, for which Letters Patent No. 173,766, were granted to me February 22, 1876; and I do hereby declare that the following is a full, clear, and exact description thereof, which will enable others skilled in the art to which it appertains to make and use the same, reference being had to the accompanying drawings, and to letters of reference marked thereon, which form a part of this specification.

A represents an ordinary pot or kettle, provided with the cover B. Near the outer edge or periphery of this cover are a number of perforations, $c$, which are partly covered by the lip C. D is a hinge-clasp, attached to the cover B. $d$ is a thumb-screw, provided for tightening the clasp to the rim of the pot or kettle.

By my device I produce a hinged cover that may be attached to any article of kitchen furniture, such as buckets, pans, &c.

For the adjustment of the cover from one article to another, the thumb-screw is turned so as to free the clasp, and the cover lifted off; then placed on the other article, with its rim between the jaws of the clasp, as shown, and the thumb-screw tightened.

Having thus fully described my invention, what I claim as new, and desire to secure by Letters Patent, is—

The combination of the cover B, hinge-clasp D, and thumb-screw $d$, substantially in the manner and for the purposes herein set forth.

In testimony that I claim the foregoing as my own I affix my signature in presence of two witnesses.

GEORGE CLEMENTS.

Witnesses:
    H. M. TINGLEY,
    CYRUS BARLOW.